(12) United States Patent
Li et al.

(10) Patent No.: US 11,590,905 B2
(45) Date of Patent: Feb. 28, 2023

(54) SWITCH FOR VEHICLE AND VEHICLE

(71) Applicant: NIO TECHNOLOGY (ANHUI) CO., LTD, Hefei (CN)

(72) Inventors: Lv Li, Shanghai (CN); Chenguang Geng, Shanghai (CN); Jiawen Zheng, Shanghai (CN); Lin Mu, Shanghai (CN); Rui Li, Shanghai (CN); Rui Zhang, Shanghai (CN)

(73) Assignee: NIO TECHNOLOGY (ANHUI) CO., LTD., Hefei (CN)

( * ) Notice: Subject to any disclaimer, the term of this patent is extended or adjusted under 35 U.S.C. 154(b) by 0 days.

(21) Appl. No.: 17/583,454

(22) Filed: Jan. 25, 2022

(65) Prior Publication Data

US 2022/0234524 A1    Jul. 28, 2022

(30) Foreign Application Priority Data

Jan. 25, 2021   (CN) .......................... 202110097570.7

(51) Int. Cl.
*B60R 16/00*     (2006.01)
*G05G 1/04*      (2006.01)

(52) U.S. Cl.
CPC ............. *B60R 16/005* (2013.01); *G05G 1/04* (2013.01)

(58) Field of Classification Search
None
See application file for complete search history.

(56) References Cited

U.S. PATENT DOCUMENTS 5,448,028 A * 9/1995 Filion .................... B60N 2/797
                                                  200/52 R

* cited by examiner

*Primary Examiner* — Vicky A Johnson
(74) *Attorney, Agent, or Firm* — Sheridan Ross P.C.

(57) ABSTRACT

The invention relates to the field of switches, and particularly provides a switch for a vehicle and a vehicle. The invention aims to solve the problem of an uneven gap between a switch and an interior trim panel of an existing vehicle. To this end, the vehicle according to the invention comprises a surface housing, the surface housing is provided with a groove, the switch is disposed in the groove, the switch comprises a pressing rod assembly, the pressing rod assembly comprises a rocking bar and a connecting piece, the rocking bar is rotatably connected to the connecting piece, and the connecting piece is fixedly connected to the groove. When the pressing rod assembly is installed, because no member for positioning the pressing rod assembly is available, the pressing rod assembly can be installed at any position in a transverse direction of the groove. Therefore, when the groove deviates due to the existence of tolerance, the position tolerance of the groove is absorbed by a position change of the pressing rod assembly, which is more conducive to adjusting a gap between the groove and the pressing rod assembly and can ensure uniformity of the gap between the groove and the pressing rod assembly.

9 Claims, 1 Drawing Sheet

SWITCH FOR VEHICLE AND VEHICLE

CROSS-REFERENCE TO RELATED APPLICATIONS

This application claims the benefit of China Patent Application No. 202110097570.7 filed Jan. 25, 2021, the entire contents of which are incorporated herein by reference in its entirety.

TECHNICAL FIELD

The invention relates to the technical field of switches, and particularly provides a switch for a vehicle and a vehicle.

BACKGROUND ART

In the field of vehicles, requirements for quality of switches are relatively strict. Therefore, in design and development of switches, it is hoped that a gap/flush is small and uniform, so as to improve overall texture of a vehicle trim panel, and solve problems such as dust accumulation caused by a large gap. Because a key switch is assembled in an interior trim panel of a vehicle, the size of the gap between the key switch and the interior trim panel of the vehicle is affected by tolerance of the interior trim panel of the vehicle, that is, when the interior trim panel deviates, a phenomena that the size of the gap between the key switch and the interior trim panel is uneven appears, so that the deviation is amplified by many times in the flush, and the texture of the entire key switch is greatly reduced.

Accordingly, a novel switch for a vehicle and a vehicle are required in this field to solve the problem of an uneven gap between a switch and an interior trim panel of an existing vehicle.

SUMMARY OF THE INVENTION

To solve the foregoing problem in the prior art, that is, to solve the problem of an uneven gap between a switch and an interior trim panel of an existing vehicle, the invention provides a switch for a vehicle. The vehicle comprises a surface housing, the surface housing is provided with a groove, the switch is disposed in the groove, the switch comprises a pressing rod assembly, the pressing rod assembly comprises a rocking bar and a connecting piece, the rocking bar is rotatably connected to the connecting piece, and the connecting piece is fixedly connected to the groove.

In a preferred technical solution of the foregoing switch for a vehicle, the switch further comprises a crushable rib, the crushable rib is disposed between the connecting piece and the groove, the crushable rib has the consistent thickness, and a strength of an upper side of the crushable rib is less than a strength of a lower side of the crushable rib.

In a preferred technical solution of the foregoing switch for a vehicle, the connecting piece is a light band, and the light band is flush with an outer surface of the groove.

In a preferred technical solution of the foregoing switch for a vehicle, the pressing rod assembly further comprises a key, and the key covers the rocking bar.

In a preferred technical solution of the foregoing switch for a vehicle, the connecting piece is disposed on an inner circumferential wall of the groove, the crushable rib is annular, and the crushable rib is disposed at a circumferential gap between the connecting piece and the groove.

In a preferred technical solution of the foregoing switch for a vehicle, the crushable rib has a strip shape, and at least two crushable ribs are provided.

In a preferred technical solution of the foregoing switch for a vehicle, the rocking bar is rotatably connected to the connecting piece along a first rotating shaft in a transverse direction of the connecting piece, the pressing rod assembly further comprises an intermediate part, the intermediate part is provided with the first rotating shaft, a plurality of rocking bars are provided, and two adjacent rocking bars are rotatably connected through the first rotating shaft.

In a preferred technical solution of the foregoing switch for a vehicle, the first rotating shaft and the rocking bar are disposed side by side, or the first rotating shaft is disposed on a bottom side of the rocking bar.

In a preferred technical solution of the foregoing switch for a vehicle, one or two rocking bars are provided.

The invention further provides a vehicle. The vehicle comprises a switch for a vehicle according to any one of the foregoing technical solutions.

It may be understood by those skilled in the art that, in the technical solution of the invention, the vehicle comprises a surface housing, the surface housing is provided with a groove, the switch is disposed in the groove, the switch comprises a pressing rod assembly, the pressing rod assembly comprises a rocking bar and a connecting piece, the rocking bar is rotatably connected to the connecting piece, and the connecting piece is fixedly connected to the groove. It may be understood that the surface housing is an interior trim panel of a vehicle, for example, may be a vehicle roof interior trim panel or a vehicle door interior trim panel, or the like.

Through the foregoing arrangement, when the pressing rod assembly is installed, because no member for positioning the pressing rod assembly is available, the pressing rod assembly can be installed at any position in a transverse direction of the groove. Therefore, when the groove deviates due to the existence of tolerance, the position tolerance of the groove is absorbed by a position change of the pressing rod assembly, which is more conducive to adjusting a gap between the groove and the pressing rod assembly and thereby can ensure uniformity of the gap between the groove and the pressing rod assembly.

BRIEF DESCRIPTION OF THE DRAWINGS

A switch for a vehicle according to the invention is described below with reference to the drawings. In the drawings.

LIST OF REFERENCE NUMERALS

Figure 1:
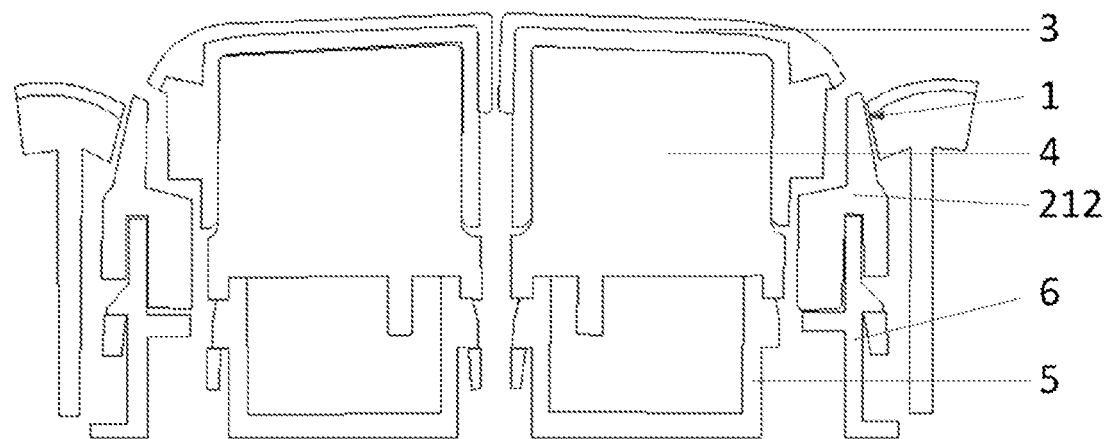
FIG. 1 is a schematic structural diagram of a switch in the prior art.

1—Groove; 2—Switch; 21—Pressing rod assembly; 211—Rocking bar; 212—Connecting piece; 213—Key; 214—Intermediate part; 2121—First rotating shaft; 22—Crushable rib; 3—Exterior part; 4—Key body; 5—Housing; 6—Opponent piece.

DETAILED DESCRIPTION OF EMBODIMENTS

Preferred implementations of the invention are described below with reference to the drawings. It should be understood by those skilled in the art that these implementations are only for explaining the technical principles of the invention and are not intended to limit the scope of protection of the invention. Those skilled in the art can make adjustments to the implementations as required so as to adapt to specific application scenarios. For example, although the crushable rib in the description is described as being annular, clearly, various other forms may be used in the invention. For example, the crushable ribs may be in a strip shape and are distributed at intervals at a circumferential gap between a light band and a groove, as long as the crushable ribs can adjust the gap between the groove and the light band to keep the gap uniform.

It should be noted that in the description of the invention, the terms, such as "center", "upper", "lower", "left", "right", "vertical", "horizontal", "inner" and "outer", that indicate directions or positional relationships are based on the directions or positional relationships shown in the drawings only for convenience of description, and do not indicate or imply that the device or element must have a specific orientation, be constructed and operated in a specific orientation, and therefore cannot be understood as a limitation to the invention. In addition, the terms "first", "second" and "third" are for descriptive purposes only and should not be construed as indicating or implying relative importance.

In addition, it should be further noted that, in the description of the invention, the terms "install", "connected to" and "connect" should be interpreted in a broad sense unless explicitly defined and limited otherwise. For example, a connection may be a fixed connection, a detachable connection or an integral connection; may be a mechanical connection or an electrical connection; and may be a direct connection, an indirect connection by means of an intermediary, or internal communication between two elements. For those skilled in the art, the specific meaning of the abovementioned terms in the invention can be interpreted according to a specific situation.

As shown in FIG. 1, compared with a conventional direct-pressure switch, a toggle switch has a different operation mode, so a housing 5 for positioning a poking key is additionally provided to implement the operation, making it impossible to effectively control a gap between the poking key and a groove 1 when the groove 1 is entirely deviated. Under limitations of a surface treatment process and an assembly structure of a poking switch itself, for example, in some structural designs added with related functions, a toggle key is usually divided into an exterior part 3, a key body 4, a housing 5, an opponent piece 6, and a connecting piece 212. A specific connection relationship is as follows: The exterior part 3 is wrapped on the key body 4, and then the key body 4 is connected to the housing 5 through a rotating shaft to poke the key and further control the on-off of a circuit. In addition, the opponent piece 6 is connected to the housing 5 and the connecting piece 212, and the connecting piece 212 is fixedly connected to the groove 1. The housing 5 and the opponent piece 6 are fixedly arranged, that is, the housing 5 is a positioning reference of the key body 4, and the opponent piece 6 is a positioning reference of the connecting piece 212. Because of the existence of machining tolerance of the groove 1, the groove 1 is entirely deviated, but the connection between the housing 5 and the key body 4 and the connection between the opponent piece 6 and the connecting piece 212 are rigid, so that it is impossible to control a gap between the groove 1 and the connecting piece 212 and a gap between the connecting piece 212 and the exterior part 3. With the groove 1 entirely deviating leftward as an example, at a left position in FIG. 1, the gap between the groove 1 and the connecting piece 212 is larger; and at a right position, due to the pressing action of the groove 1, no gap may exist between the groove 1 and the connecting piece 212, and complete attachment is implemented. In this case, the connecting piece 212 on the right is deviated leftward. As a result, in this case, the uniformity of the gap between the connecting piece 212 and the groove 1 cannot be ensured, and the gap between the right exterior part 3 and the right connecting piece 212 is smaller because the right connecting piece 212 is deviated leftward, so that the uniformity of the gap between the exterior part 3 and the connecting piece 212 also cannot be ensured.

Figure 2:
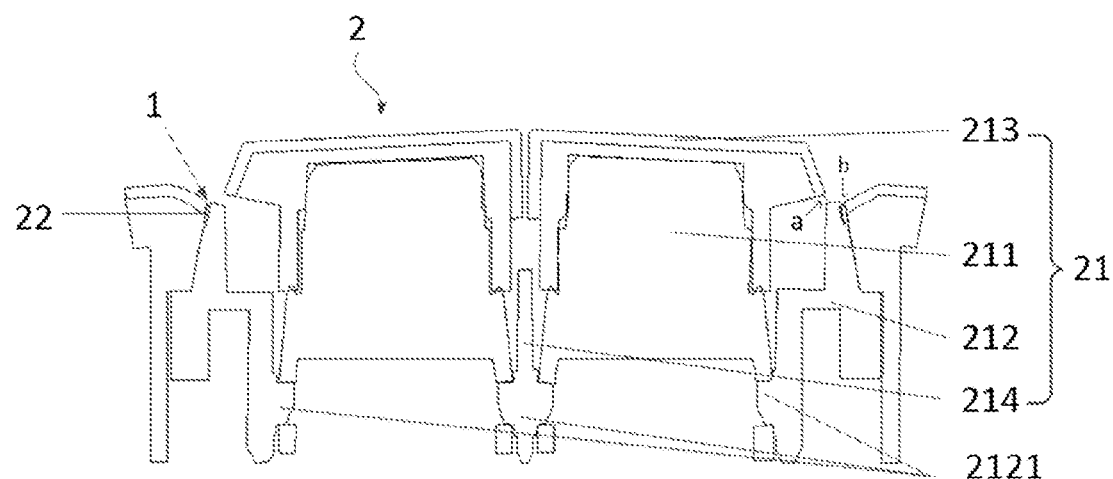
FIG. 2 is a schematic structural diagram of a switch for a vehicle according to the invention.

As shown in FIG. 2, to solve the problem of an uneven gap between a switch 2 and an interior trim panel of an existing vehicle, the vehicle according to the invention comprises a surface housing, the surface housing is provided with a groove 1, the switch 2 is disposed in the groove 1, the switch 2 comprises a pressing rod assembly 21, the pressing rod assembly 21 comprises a rocking bar 211 and a connecting piece 212, the rocking bar 211 is rotatably connected to the connecting piece 212 along a first rotating shaft 2121 in a transverse direction of the connecting piece 212, and the connecting piece 212 is fixedly connected to the groove 1.

The foregoing arrangement has the following advantages: in a conventional solution, the housing 5 and the opponent piece 6 need to be positioned and installed first, and then the pressing rod assembly 21 needs to be installed. However, due to the existence of tolerance of the groove 1, an uneven gap may exist between the pressing rod assembly 21 and the groove 1 after installation, and the pressing rod assembly 21 cannot be adjusted. In the invention, the positioning action of the housing on the pressing rod assembly 21 is eliminated, and the connecting piece 212 is used for positioning, so that when the pressing rod assembly 21 is installed, the pressing rod assembly 21 can be installed at any position in a transverse direction of the groove 1. Therefore, when the groove 1 deviates due to the existence of tolerance, the position tolerance of the groove 1 can be absorbed by a position change of the pressing rod assembly 21, which is more conducive to adjusting a gap between the groove 1 and the pressing rod assembly 21 and thereby can ensure uniformity of the gap between the groove 1 and the pressing rod assembly 21.

Specifically, in a preferred implementation, the connecting piece 212 is a light band, a crushable rib 22 is disposed between the light band and the groove 1, the pressing rod assembly 21 further comprises a key 213, and the key 213 covers the rocking bar 211. That the key 213 covers the rocking bar 211 can make the appearance more beautiful on the one hand, and can play the role of skid resistance and improving a poking touch on the other hand. The crushable rib is made of a material that can be crushed and deformed and has a certain thickness.

To enable a user to find the switch smoothly in a dark situation, in the invention, a light band is added on the basis of a conventional toggle switch, so that the switch can emit light in the dark situation. As shown in FIG. 1, with the addition of the light band, the connecting piece 212 is equivalent to the light band, and there are four dimension chains that affect the control over the gap between the exterior part 3 and the light band on the basis of the light band. The dimension chains in the invention are machining dimensions and assembly dimensions of parts, and a machining dimension and an assembly dimension of each part affecting the gap are referred to as one dimension chain. With reference to FIG. 1, the four dimension chains that affect the gap between the exterior part 3 and the light band comprise: a machining dimension and an assembly dimension of the opponent piece 6 (for example, when an assembly position of the opponent piece 6 is deviated leftward or rightward, or a height thereof is lowered, the position of the light band is affected, thereby affecting the gap between the exterior part 3 and the light band), an assembly dimension of the housing 5 and a machining dimension of the housing 5, a machining dimension and an assembly dimension of the key body 4 (for example, when a gap exists between the key body 4 and the housing 5 due to machining tolerance, the key body 4 cannot be completely attached to the housing 5, which makes the key body 4 deviated upward, thereby enlarging the gap between the exterior part 3 and the groove 1), and a machining dimension and an assembly dimension of the exterior part 3 (for example, the gap between the exterior part 3 and the groove 1 is affected when machining tolerance exists at a transition position of the exterior part 3). Due to the large number of dimension chains, it is difficult to control the gap between the exterior part 3 and the light band in this situation, and the gap between the light band and the groove 1 cannot be ensured. As a result, it cannot be ensured that a connection structure between the key body 4 and the exterior part 3 is centered in the groove 1, and the texture of the entire toggle switch is greatly lowered.

To solve the foregoing problems, in the invention, the tolerance caused by the groove 1 is absorbed through the overall position movement of the key 213, the rocking bar 211 and the light band, that is, because of the existence of the machining tolerance of the groove 1, when the toggle switch 2 according to the invention is assembled, the light band serves as the positioning reference of the toggle switch 2 according to the invention, and a gap a between the light band and the key 213 is determined by its internal structure. Therefore, through dimension control, on the premise that the gap a between the key 213 and the light band is uniform, as long as a gap b between the light band and the groove 1 is ensured to be uniform, it can be ensured that the key 213 is always in a middle position of the light band. For example, when the groove 1 is deviated leftward as a whole due to dimension tolerance, the gap can be adjusted by moving the light band leftward, so that the light band is moved to a central position and then fixedly connected. In a possible implementation, the gap b between the light band and the groove 1 can be adjusted by arranging the crushable rib 22 between the left light band and the right light band and the groove 1, so that a gap between the left light band and the groove 1 and a gap between the right light band and the groove 1 are kept uniform.

In a preferred implementation, the light band is disposed on an inner circumferential wall of the groove 1, and the crushable rib 22 is disposed at a circumferential gap between the light band and the groove 1, that is, the light band is annular. In addition, the arranged crushable rib 22 is also annular, that is, the crushable rib 22 is arranged about the whole circumference of the light band. Therefore, the uniformity of the gap b between the groove 1 and the light band can be further ensured. Specifically, the uniformity of the gap b between the light band and the groove 1 is ensured through the arrangement of the crushable rib 22 with the consistent thickness. Further, the thickness of the crushable rib 22 is a little greater than a width b of the gap, so that the crushable rib has a certain interference amount, and therefore it can be ensured that the crushable rib 22 is always attached to an inner wall of the groove 1 and the light band. A strength of an upper side of the crushable rib 22 is less than a strength of a lower side of the crushable rib. Because the strength of the upper side of the crushable rib 22 is lower while the strength of the lower side is higher, the lower side of the crushable rib 22 can act as a fixed support between the groove 1 and the light band. Because of the existence of the interference amount, the upper side of the crushable rib 22 is pressed and crushed, so as to ensure that the original gap a is kept between the key 213 and the light band and that the gap b between the entire light band and the groove 1 is very uniform. The upper side of the crushable rib 22 is one side close to an outer surface of the groove 1, and the lower side is one side close to a bottom surface of the groove 1.

In addition, the housing 5 and the opponent piece 6 in FIG. 1 are not used as a positioning reference for the switch 2 according to the invention, but a movement mechanism composed of the key 213 and the rocking bar 211 is directly assembled on the light band by using the light band as the positioning reference. Therefore, the number of dimension chains for controlling the gap is reduced to two by using the light band as the reference, and the dimension chains are respectively: an assembly dimension and a machining dimension of the rocking bar 211 (for example, a position and height where the rocking bar 211 matches the light band affect the gap a between the key 213 and the light band), and an installation position and a dimension of the key 213, so that the number of the dimension chains of the switch 2 according to the invention is reduced by a half compared with the number of the dimension chains in the technical solution of FIG. 1. Therefore, the dimension of the switch 2 can be controlled more accurately, and the uniformity of the gap a between the key 213 and the light band is ensured, so that the movement mechanism composed of the key 213 and the rocking bar 211 is always in the middle of the light band. On this basis, the switch 2 according to the invention can always be in the middle of the groove 1 by controlling the uniformity of the gap b between the light band and the groove 1.

In a possible implementation, to ensure the smoothness of the surface of the switch 2 and avoid collision, the light band is flush with the outer surface of the groove 1.

In a possible implementation, the pressing rod assembly 21 further comprises an intermediate part 214, the intermediate part 214 is provided with the first rotating shaft 2121, a plurality of rocking bars 211 are provided, and two adjacent rocking bars 211 are rotatably connected through the first rotating shaft 2121.

In an embodiment in which a plurality of rows of keys 213 are arranged side by side, a slight deviation between parts is magnified by many times in a flush, which leads to unevenness of surfaces of the plurality of keys 213, and switches on a vehicle often appear side by side, such as a skylight control switch, a media and television control switch, and a door and window control switch. To solve the foregoing problems, in the invention, two rocking bars 211 are used as an example for description. That is, as shown in FIG. 2, the two rocking bars 211 are rotatably connected through the arrangement of the intermediate part 214. In addition, each of the rocking bars 211 and a rotating shaft of the light band are coaxially arranged (that is, in the transverse direction in the groove 1), that is, the rotating shaft is the first rotating shaft 2121. Therefore, four dimension chains are provided in this arrangement, while eight dimension chains of two side-by-side switches 2 in FIG. 1 are provided, that is, twice on the original basis. The number of dimension chains of double-row switches according to the invention can be reduced to a half of the number of the dimension chains in FIG. 1, so that it is easier to control the dimension of the switches 2, which improves control precision and reduces zero drift, thereby ensuring that the surfaces of the switches 2 are flat. Certainly, to meet use requirements for various switches 2, one rocking bar 211 and one key 213 may be provided for the switch 2 for a vehicle according to the invention.

The first rotating shaft 2121 and the rocking bar 211 may be arranged side by side, or the first rotating shaft 2121 may be arranged on a bottom side of the rocking bar 211. That is, as shown in FIG. 2, the side-by-side arrangement of the first rotating shaft 2121 and the rocking bar 211 can simplify the structure of the light band, decrease the use of materials and reduce the production cost. In addition, the arrangement of the first rotating shaft 2121 on the bottom side of the rocking bar 211 can make the light band form an integrated structure and reduce the number of parts used.

In conclusion, the invention is further optimized on the basis of a conventional solution of the toggle switch 2, and the movement mechanism composed of the key 213 and the rocking bar 211 is directly assembled on the light band, so that the position of the entire movement mechanism can be adjusted with the tolerance deviation of the groove 1. The arrangement of the crushable rib 22 ensures the uniformity of the gap between the key 213 and the groove 1. In addition, the number of the dimension chains of the switch 2 according to the invention can be reduced to a half compared with that of the technical solution of FIG. 1, which ensures the uniformity of the gap b between the light band and the groove 1, and also ensures the uniformity of the gap a between the key 213 and the light band, so that the key 213 is always in the middle of the groove 1. Especially in a structure of a switch 2 involving a plurality of rows of keys 213, the arrangement of the invention can ensure that the surfaces of the keys are flat, and avoid a situation in which the unevenness caused by a flush affects the texture of the switch 2.

It should be noted that the foregoing implementations are only used to explain the principles of the invention, and are not intended to limit the scope of protection of the invention. Those skilled in the art can adjust the foregoing structures without departing from the principle of the invention, so that the invention is applicable to more specific application scenarios.

For example, in an alternative implementation, the light band may be a decorative part or the like. These implementations do not depart from the principle of the invention and therefore shall all fall within the scope of protection of the invention.

For example, in an alternative implementation of the crushable rib 22, the switch comprises a length adjusting part, the connecting piece is provided with a threaded hole, the length adjusting part is adapted to the threaded hole, and the length of the length adjusting part can be adjusted in the threaded hole to control the gap between the light band and the groove 1, as long as the gap between the light band and the groove 1 can be uniform. These implementations do not depart from the principle of the invention, and therefore shall fall within the scope of protection of the invention.

For example, in another alternative implementation, the light band may be not flush with the outer surface of the groove 1. These implementations do not depart from the principle of the invention and therefore shall fall within the scope of protection of the invention.

For example, in another alternative implementation, the crushable rib 22 may be in a strip shape or the like, and the crushable ribs 22 may be disposed at intervals at a circumferential gap between the light band and the groove 1 or the like, as long as the uniformity of the gap between the groove 1 and the light band can be ensured. These implementations do not depart from the principle of the invention and therefore shall fall within the scope of protection of the invention.

For example, in another alternative implementation, light bands may be disposed on two sides of the groove 1 or the like. The implementations do not depart from the principle of the invention and therefore shall fall within the scope of protection of the invention.

In addition, the invention further provides a vehicle. The vehicle is provided with a switch 2 for a vehicle according to any one of the foregoing implementations.

Heretofore, the technical solutions of the invention have been described in conjunction with the preferred implementations shown in the drawings, however, those skilled in the art can readily understand that the scope of protection of the invention is obviously not limited to these specific implementations. Those skilled in the art could make equivalent changes or substitutions to the related technical features without departing from the principles of the invention, and all the technical solutions after the changes or the substitutions fall within the scope of protection of the invention.

What is claimed is:

1. A switch for a vehicle, wherein the vehicle comprises a surface housing, the surface housing is provided with a groove, the switch is disposed in the groove, the switch comprises a pressing rod assembly, the pressing rod assembly comprises a rocking bar and a connecting piece, the rocking bar is rotatably connected to the connecting piece, and the connecting piece is fixedly connected to the groove, and wherein the switch further comprises a crushable rib, the crushable rib is disposed between the connecting piece and the groove, the crushable rib has a consistent thickness, and a strength of an upper side of the crushable rib is less than a strength of a lower side of the crushable rib.

2. The switch for a vehicle according to claim 1, wherein the connecting piece is a light band, and the light band is flush with an outer surface of the groove.

3. The switch for a vehicle according to claim 1, wherein the pressing rod assembly further comprises a key, and the key covers the rocking bar.

4. The switch for a vehicle according to claim 1, wherein the connecting piece is disposed on an inner circumferential wall of the groove, the crushable rib is annular, and the crushable rib is disposed at a circumferential gap between the connecting piece and the groove.

5. The switch for a vehicle according to claim 1, wherein the crushable rib has a strip shape, and at least two crushable ribs are provided.

6. The switch for a vehicle according to claim 1, wherein the rocking bar is rotatably connected to the connecting piece along a first rotating shaft in a transverse direction of the connecting piece, the pressing rod assembly further comprises an intermediate part, the intermediate part is provided with the first rotating shaft, a plurality of rocking bars are provided, and two adjacent rocking bars are rotatably connected through the first rotating shaft.

7. The switch for a vehicle according to claim 6, wherein the first rotating shaft and the rocking bar are disposed side by side, or the first rotating shaft is disposed on a bottom side of the rocking bar.

8. The switch for a vehicle according to claim 6, wherein one or two rocking bars are provided.

9. A vehicle, comprising a switch for a vehicle according to claim 1.

* * * * *